(12) United States Patent
Kamiya

(10) Patent No.: US 6,658,310 B1
(45) Date of Patent: Dec. 2, 2003

(54) METHOD OF ENTERING AUDIO SIGNAL, METHOD OF TRANSMITTING AUDIO SIGNAL, AUDIO SIGNAL TRANSMITTING APPARATUS, AND AUDIO SIGNAL RECEIVING AND REPRODUCING APPARATUS

(75) Inventor: Ryo Kamiya, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/451,397

(22) Filed: Nov. 30, 1999

Related U.S. Application Data

(62) Division of application No. 08/921,191, filed on Aug. 29, 1997, now Pat. No. 6,044,307.

(30) Foreign Application Priority Data

Sep. 2, 1996 (JP) ............................................. 8-232094
Nov. 13, 1996 (JP) ............................................. 8-302182

(51) Int. Cl.[7] .............................................. G06F 17/00
(52) U.S. Cl. .............................................. 700/94; 381/1
(58) Field of Search .............................. 381/1; 700/94; 375/260; 341/143, 141

(56) References Cited

U.S. PATENT DOCUMENTS 4,912,423 A * 3/1990 Milkovic et al. ............ 330/255
5,561,425 A * 10/1996 Therssen ...................... 341/143
5,577,044 A * 11/1996 Oxford ........................ 370/522
5,768,316 A * 6/1998 Sogo ........................... 375/260

OTHER PUBLICATIONS

Burns et al, Principles of Electronic Circuits, West Pulishing Company, 1987, pps 324–327.*

* cited by examiner

*Primary Examiner*—Ping Lee
(74) *Attorney, Agent, or Firm*—Morrison & Foerster LLP

(57) ABSTRACT

A method of entering an audio signal into a data processing apparatus, in which analog audio signals of at least two channels as the audio signal are digitized by and transmitted from an audio signal output device on a side of an audio source to an audio signal input device on a side of the data processing apparatus. A clock signal is supplied from the audio signal input device to the audio signal output device. The audio signal output device performs delta-sigma ($\Delta\Sigma$) modulation on the analog audio signals of at least two channels so as to convert each of the analog audio signals of at least two channels into one-bit digital audio data for each of the at least two channels, based on the clock signal supplied to the audio signal output device. The one-bit digital audio data for the each channel is alternately selected based on the clock signal, to perform time-division multiplexing on the one-bit digital audio data for the at least two channels, to thereby produce one-bit multiplex audio data. The one-bit multiplex audio data is supplied to the audio signal input device.

4 Claims, 8 Drawing Sheets

METHOD OF ENTERING AUDIO SIGNAL, METHOD OF TRANSMITTING AUDIO SIGNAL, AUDIO SIGNAL TRANSMITTING APPARATUS, AND AUDIO SIGNAL RECEIVING AND REPRODUCING APPARATUS

This is a division of application Ser. No. 08/921,191, filed on Aug. 29, 1997, and issued on Mar. 28, 2000 as U.S. Pat. No. 6,044,307.

BACKGROUND OF THE INVENTION

1. Field of the Invention

The present invention relates to a method of entering a digitized audio signal into a data processing apparatus, such as a personal computer, method of transmitting the audio signal, and audio signal transmitting apparatus and audio signal receiving and reproducing apparatus which permit transmission of the audio signal according to this signal transmitting method.

2. Prior Art

When a computer receives stereo audio signals, analog signals may be input via analog input terminals, and converted into PCM (Pulse Code Modulation) data in the inside of the computer, or digital audio signals may be input via serial ports, such as RS-232C, or SCSI (Small Computer System Interface) ports, for example. In the former method, however, the input signals in the analog format are likely to be affected by noise from the computer. The latter method has a problem of a slow input speed, and, in most cases, cannot be used for exclusively inputting audio signals.

In view of the above situation, an audio input interface has been developed which is designed to convert digitized audio signals into serial data, and transmit the serial data via an exclusive digital audio input terminal, such as SPDIF, as shown in FIG. 1.

In the conventional audio interface as shown in FIG. 1, analog audio signals SL, SR of left (L) and right (R) channels are converted into digital signals by respective A/D converters 101, 102, and packeted by a packet circuit 103 to be converted into serial data, which is then transmitted to a personal computer 200. On the side of the personal computer 200, the received serial data are synchronized by a PLL (phase-locked loop) circuit, and the resultant packet data is decoded by a decoding circuit 202 and reassembled into original digital data. Thus, the circuit arrangement tends to be complicated, with a result of an increased cost.

The other method of transmitting digitized audio signals may be roughly classified into a method of transmitting the input signals after converting them into analog signals, and a method of transmitting the digital signals as they are. FIG. 2 shows an example of the former method. In this example, digital audio signals of L channel and R channel which are reproduced in a reproducing system (not shown) are converted into corresponding analog audio signals by respective D/A converters 301L and 301R, and then amplified by respective amplifiers 302L and 302R. The analog audio signals of the two channels obtained from the amplifiers 302L and 302R are then transmitted over respective cables 303L and 303R, amplified by amplifiers 304L and 304R, and then generated from speakers 305L and 305R.

FIG. 3 shows one example of the method of transmitting audio signals in the form of digital signals. In the example of FIG. 3, a packet of digital audio signals of L channel and R channel is transmitted from a digital output circuit 401. This packet is transmitted to a demodulator circuit 403 over a cable 402, and is demodulated by this demodulator circuit 403 into the original digital audio signals of the L channel and R channel. These digital audio signals of the respective channels are converted into analog audio signals by D/A converters 404L and 404R, amplified by amplifiers 405L, 405R, and then generated from speakers 406L and 406 R.

The above-described prior art method of FIG. 2, in which the audio signals are transmitted as analog signals, suffers from deterioration of the quality of sound reproduced from the speakers if noise is superposed on the analog signals during their transmission. Where this method is employed within digital equipment, such as a personal computer, in particular, noise involved in the digital signal system is likely to be superposed on analog audio signals during their transmission, whereby the quality of reproduced sound is considerably deteriorated. On the other hand, the method of FIG. 3 is advantageous in that the transmitted audio signal, which is a digital, signal, is highly resistant to noise. To implement this method, however, there is a need to provide the digital output circuit for assembling and transmitting a packet of digital audio signals, and the demodulator circuit for demodulating this packet, which may increase the size and cost of the whole apparatus.

SUMMARY OF THE INVENTION

It is therefore a first object of the present invention to provide a method of entering an audio signal, which method enables a simple circuit to use input terminals of analog audio signals to enter a digital audio signal into a data processing apparatus, and wherein a transmitted signal is unlikely to be affected by noise even in an environment having a lot of noise.

It is the second object of the invention to provide an audio signal transmitting method that permits an audio signal to be transmitted assuring high resistance to noise, without significantly changing the construction of the known apparatus, and to provide an audio signal transmitting apparatus and an audio signal receiving and reproducing apparatus for transmitting the audio signal according to this method.

To attain the first object, the present invention provides a method of entering an audio signal into a data processing apparatus, wherein analog audio signals of at least two channels as the audio signal are digitized by and transmitted from an audio signal output device on a side of an audio source to an audio signal input device on a side of the data processing apparatus, comprising the steps of a) supplying a clock signal from the audio signal input device to the audio signal output device; b) performing delta-sigma ($\Delta\Sigma$) modulation on the analog audio signals of at least two channels in the audio signal output device so as to convert each of the analog audio signals of at least two channels into one-bit digital audio data for each of the at least two channels, based on the clock signal supplied to the audio signal output device, c) alternately selecting the one-bit digital audio data for the each channel, based on the clock signal, in the audio signal output device, to perform time-division multiplexing on the one-bit digital audio data for the at least two channels, to thereby produce one-bit multiplex audio data, and d) supplying the one-bit multiplex audio data from the audio signal output device to the audio signal input device.

Preferably, the multiplex audio data and the clock signal are respectively transmitted to the audio signal input device and the audio signal output device, through respective input lines provided in the data processing apparatus for receiving analog audio stereo signals.

Further preferably, the method of entering an audio signal further comprises the step of separating the one-bit multiplex audio data into at least two streams of data corresponding to respective ones of the at least two channels and converting each of the at least two streams of data into multiple-bit PCM data for the each channel in the audio signal input device.

To attain the first object, the present invention also provides a data processing apparatus having an interface comprising a) a block which generates a clock signal to an external device, b) a block which receives multiplex audio data produced by one-bit quantization of audio data of at least two channels in synchronization with the clock signal and time-division multiplexing of the quantized audio data based on the clock signal in the external device, and c) a block which processes the received multiplex audio data in synchronization with the clock signal.

To attain the second object, the present invention provides a method of transmitting an audio signal from an audio signal transmitting apparatus to an audio signal receiving apparatus, comprising the steps of a) performing delta-sigma ($\Delta\Sigma$) modulation modulation and time-division multiplexing on digital audio signals of at least left channel and right channel as the audio signal in the audio signal transmitting apparatus, to produce bit stream data as a result of the time-division multiplexing of the digital audio signals, b) transmitting the bit stream data and a clock signal that is in synchronization with the bit stream data, from the audio signal transmitting apparatus to the audio signal receiving apparatus, and c) separating the bit stream data into at least two streams of data corresponding to respective ones of the at least left channel and right channel, based on the clock signal, in the audio signal receiving apparatus.

To attain the second object, the present invention also provides an audio signal transmitting apparatus comprising a one-bit D/A converter that performs delta-sigma ($\Delta\Sigma$) modulation and time-division multiplexing on digital audio signals of at least left channel and right channel, to produce time division multiplexed bit stream data, a separator that separates the bit stream data into at least two streams of data corresponding to respective ones of the at least left channel and right channel, based on a clock signal that is in synchronization with the bit stream data, an analog signal reproducing device which converts the bit stream data of each of the at least left channel and right channel, into a corresponding analog signal, a plurality of signal output terminals that respectively correspond to the at least left channel and right channel, and a selecting device which selects one of first and second modes, the first mode being established by supplying the bit stream data and the clock signal to respective ones of the signal output terminals corresponding to the at least left channel and right channel, the second mode being established by supplying the analog signal of each of the at least left channel and right channel which is transmitted from the analog reproducing device, to one of the signal output terminals which corresponds to the each channel.

To attain the second object, the present invention further provides an audio signal receiving and reproducing apparatus comprising a plurality of signal input terminals that respectively correspond to at least left channel and right channel, a plurality of analog signal reproducing devices that respectively correspond to the at least left channel and right channel, a separator that separates time division multiplexed bit stream data, into at least two streams of data corresponding to respective ones of the at least left channel and right channel, in synchronization with a clock signal, and a selecting device that selects one of first and second modes, the first mode being established by transmitting input signals received by the signal input terminals corresponding to the at least left channel and right channel to the separator, the input signals being the bit stream data and the clock signal, and transmitting the at least two streams of data corresponding to the respective ones of the at least left channel and right channel, from the separator to the analog signal reproducing devices corresponding to the respective channels, the second mode being established by transmitting input signals received by the signal input terminals corresponding to the at least left and right channels, to the analog signal reproducing devices corresponding to the respective channels.

The above and other objects, features and advantages of the invention will become more apparent from the following detailed description taken in conjunction with the accompanying drawings.

DETAILED DESCRIPTION

Figure 1:
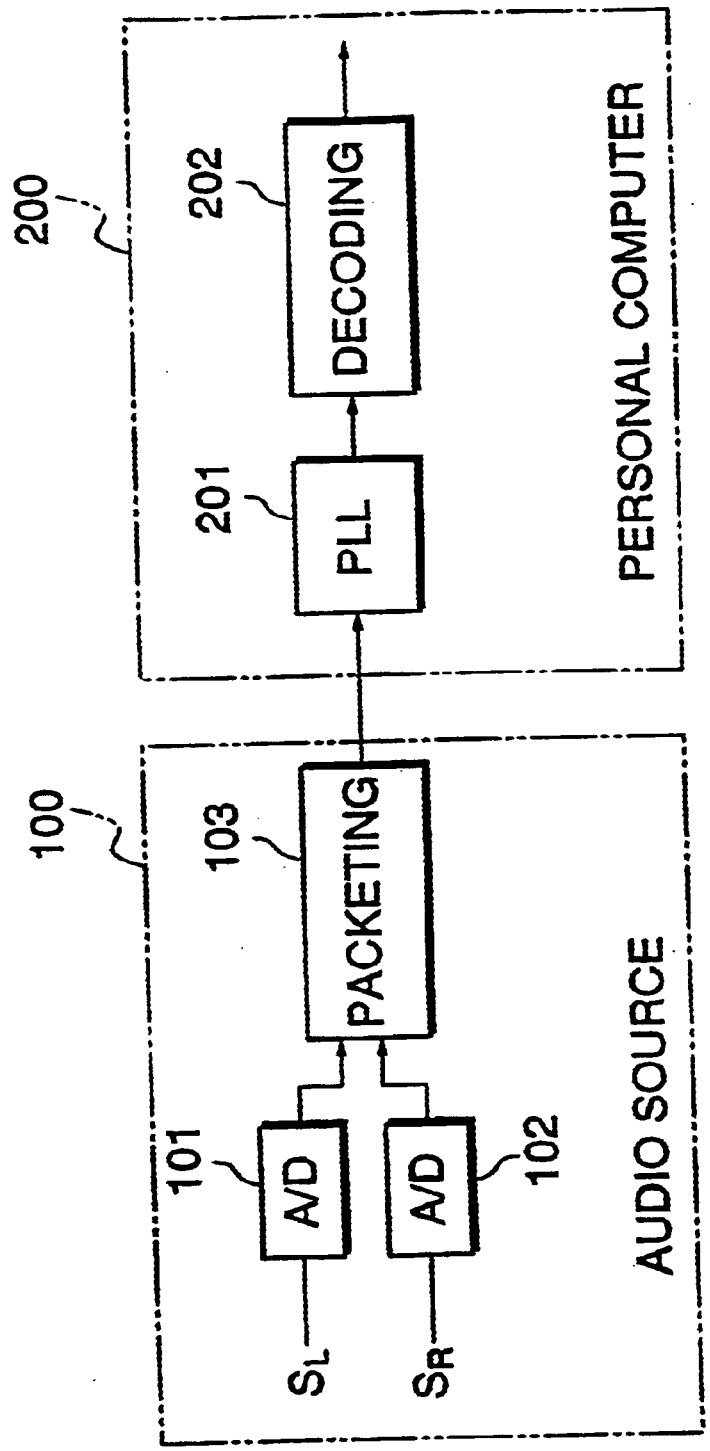
FIG. 1 is a block diagram illustrating a conventional audio signal input method.
Figure 2:
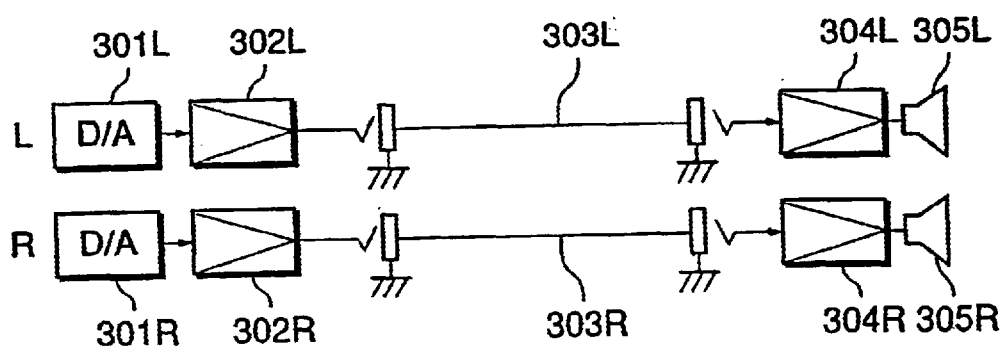
FIG. 2 is a block diagram illustrating a conventional audio signal transmitting method.
Figure 3:
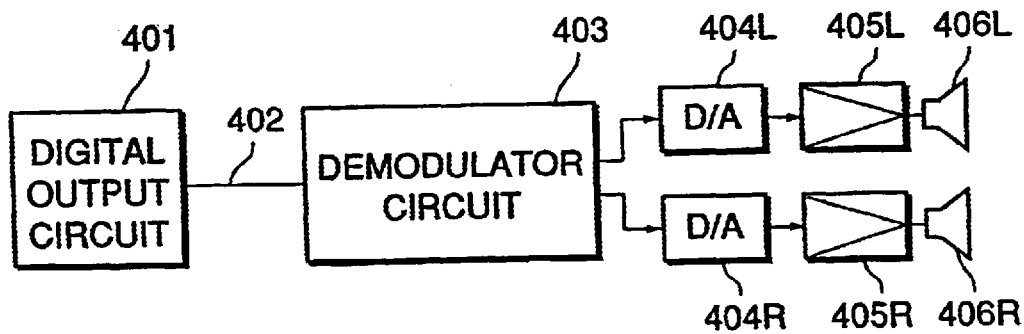
FIG. 3 is a block diagram illustrating another conventional audio signal transmitting method.

Some embodiments of the present invention will be described referring to the drawings.

Figure 4:
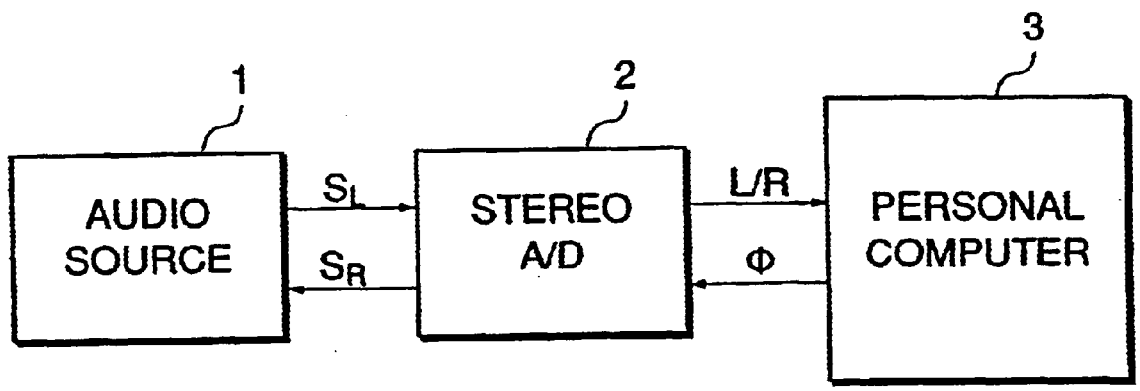
FIG. 4 is a block diagram showing the construction of a system to which an audio signal input method according to one embodiment of the present invention is applied.

Referring first to FIG. 4, there is shown the construction of a system to which an audio signal input method according to one embodiment of the present invention is applied.

A stereo A/D converter 2 performs one-bit A/D conversion and time-division multiplexing on analog audio signals SL, SR of left (L) and right (R) channels supplied from an audio source 1, such as a microphone, audio reproducing device, electronic instrument, or a mixer, so as to produce a single-bit multiplex audio data L/R, which is in turn supplied to a personal computer 3. On the other hand, a clock signal is supplied from the personal computer 3 to the stereo A/D converter 12 so as to control the timing of the one-bit A/D conversion and time-division multiplexing.

Figure 5:
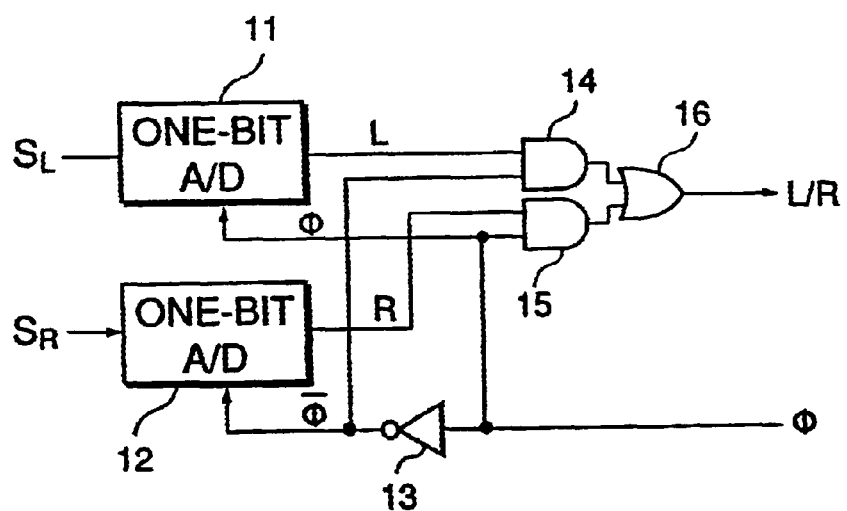
FIG. 5 is a block diagram showing the construction of a stereo A/D converter of the system of FIG. 4.

The stereo A/D converter 2 is equivalent to an audio signal output device provided on the side of the audio source 1, and is constructed as shown in FIG. 5 by way of example.

The stereo A/D converter 2 includes a single-bit A/D converter 11 for converting the analog audio signal SL into a one-bit digital signal based on the clock signal $\phi$, and a single-bit A/D converter 12 for converting the analog audio signal SR into a one-bit digital signal based on a clock signal (represented as "$-\phi$") into which the clock signal is inverted by an inverter 13. The obtained one-bit audio data L, R of each channel is received by an input terminal of a corresponding one of AND gates 14, 15. The AND gates 14, 15 alternately pass the audio data L, R based on the clock signals $-\phi$, $\phi$ supplied to the other input terminals thereof. These audio data L, R are combined by an OR gate 16, to produce one-bit multiplex audio data L/R.

Figure 6:
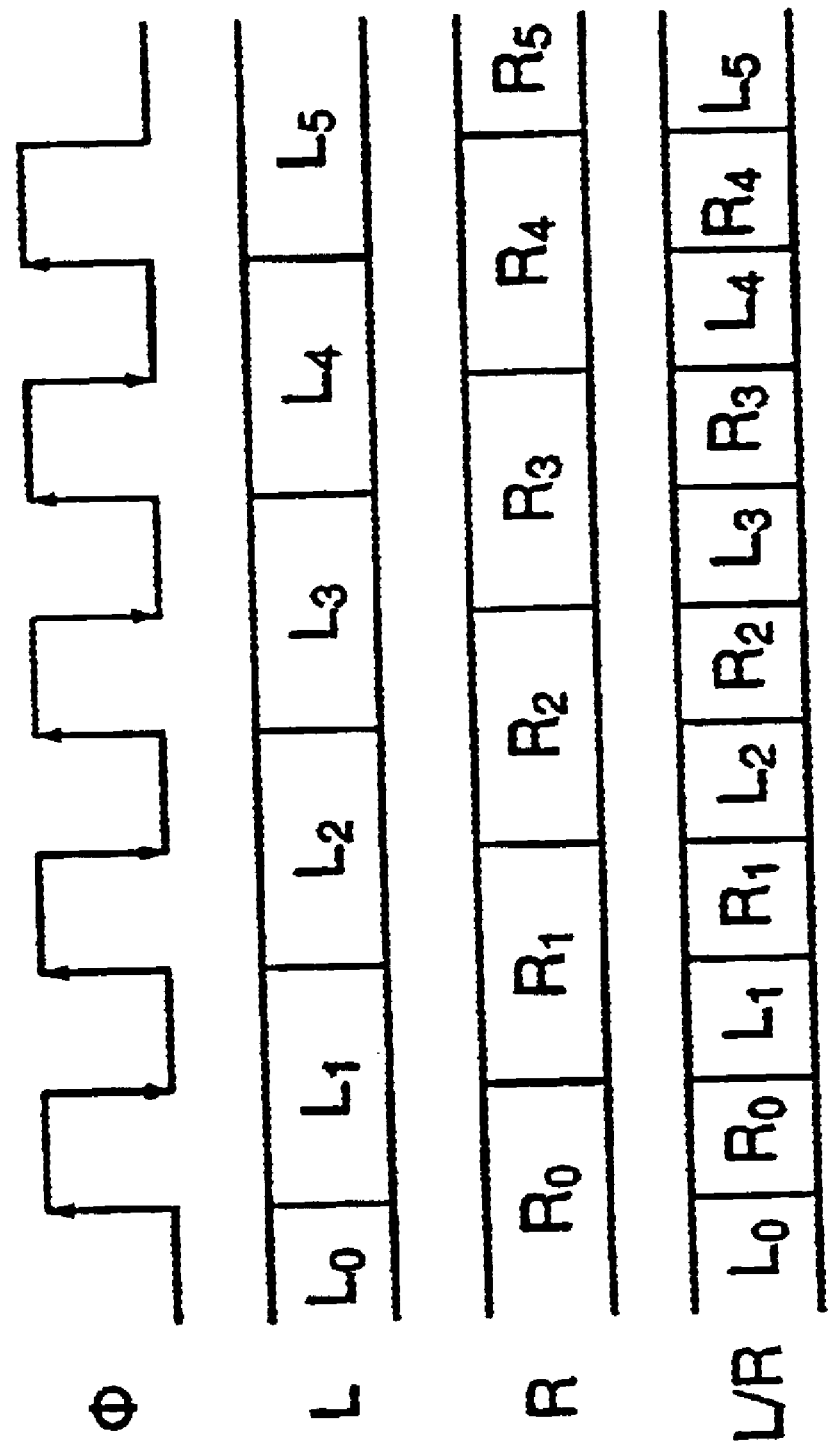
FIG. 6 is a timing chart showing the operation of the stereo A/D convertor of FIG. 5.

FIG. 6 is a timing chart showing the above operation. The phases of one-bit digital data L, R of left and right channels are shifted from each other by a half cycle of the clock signal $\phi$, and these data L, R are alternately selected so as to provide multiplex audio data L/R in which the data of the left and right channels are switched in a cycle that is twice the cycle of the clock signal. Where the cycle of the clock signal $\phi$ is set to around 12 MHz, the phase difference of the data of the right and left channels in the multiplex audio data is around 40 ns, which has absolutely no influence on the sense of hearing.

Figure 7:
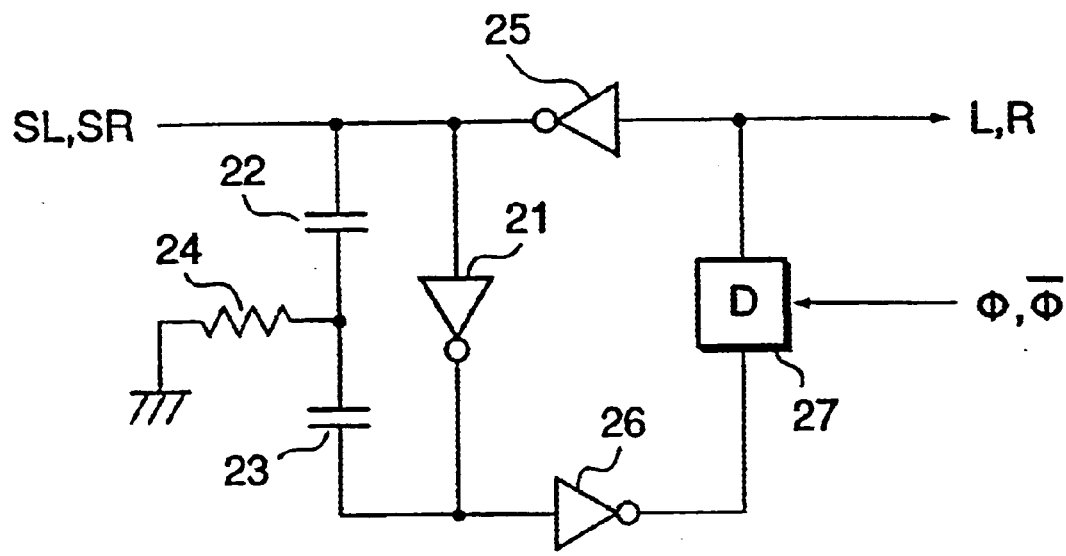
FIG. 7 is a circuit diagram showing the construction of a single-bit A/D converter used in the stereo A/D convert of FIG. 5.

For example, well-known secondary delta-sigma ($\Delta\Sigma$) modulators as shown in FIG. 7 may be used as the one-bit A/D converters 11, 12. In the delta-sigma modulator, a two-stage integrator is constituted by an input-side inverter 21, capacitors 22, 23 coupled in series with the input and output ends of the inverter 21, a resistor 24 that is pulled down from a junction of the capacitors 22, 23, and an inverter 25 provided on a feedback path, and a quantizer is constituted by an inverter 26 provided on the output side of the inverter 21, while a delay holding circuit is constituted by a latch circuit 27 provided between the output of the inverter 26 and the feedback path.

Figure 8:
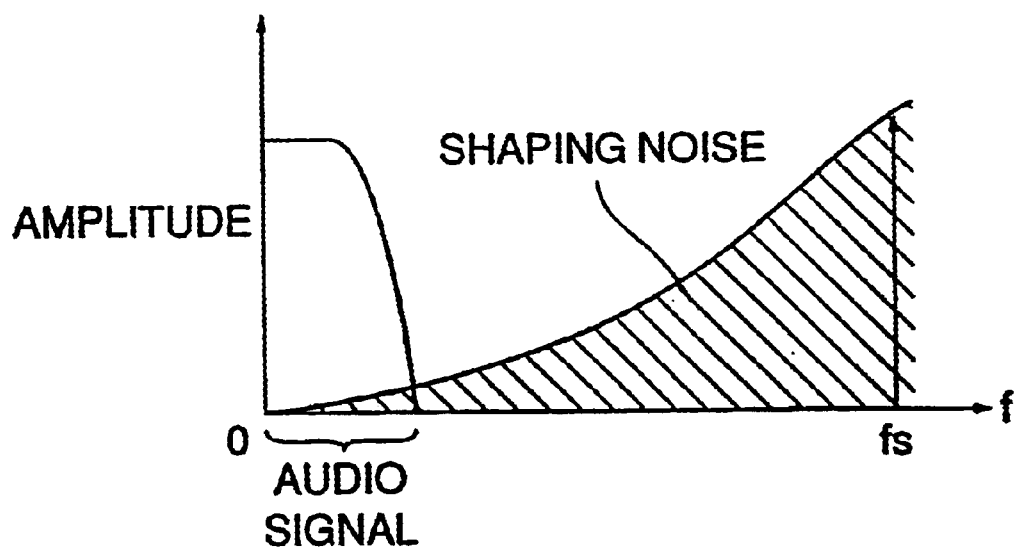
FIG. 8 is a graph useful in explaining the effect of the circuit of FIG. 7.

The delta-sigma modulator is substantially equivalent to a modulator in which a low-boost integrator is provided on the input side thereof, and a low-cut differentiator is provided on the output side. This modulator is known as having a noise-shaping effect to improve S/N in an audible band, by shaping noise to concentrate on the high-frequency side, as shown in FIG. 8.

Figure 9:
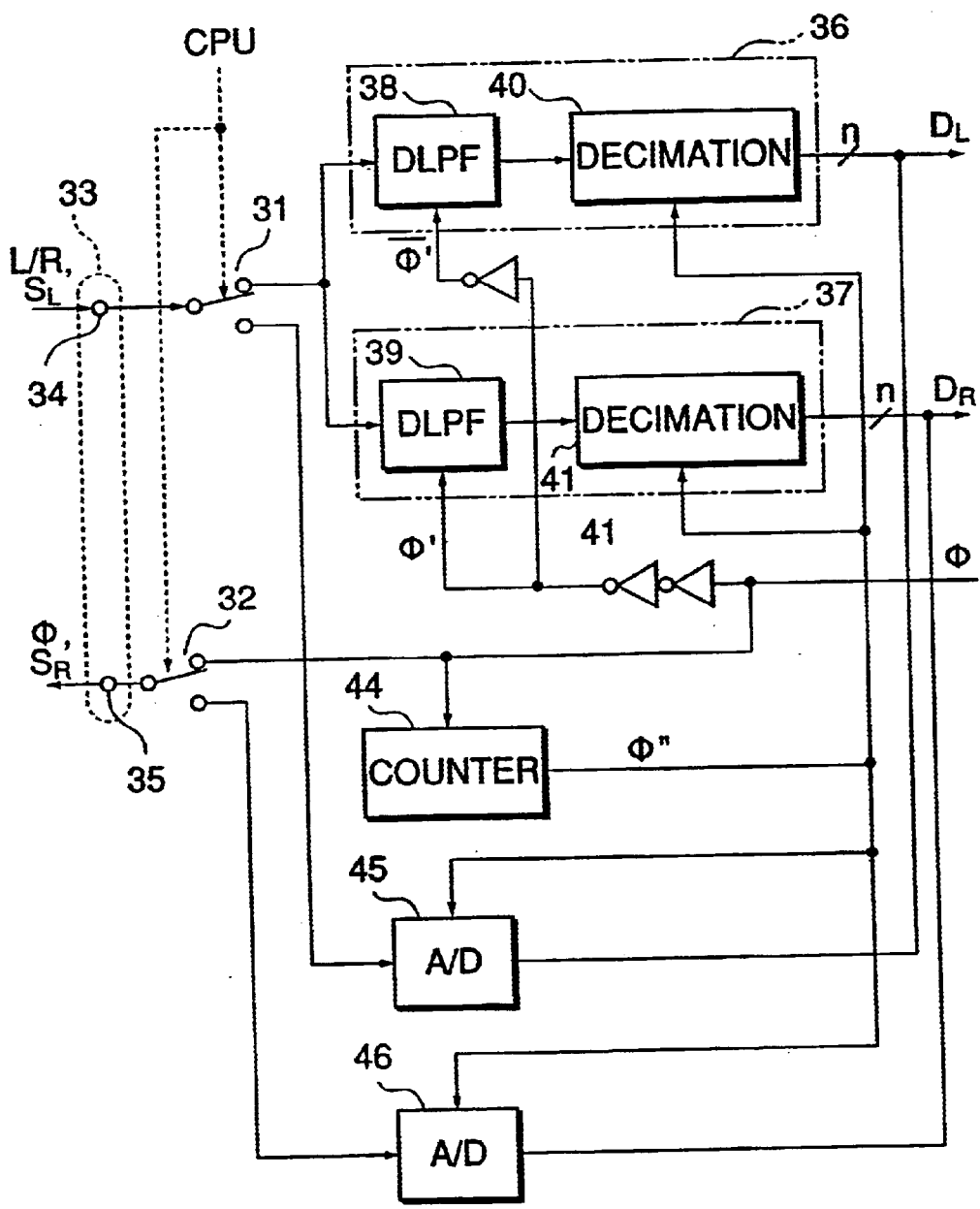
FIG. 9 is a block diagram showing an audio input interface of a computer in the system of FIG. 4.

FIG. 9 shows the construction of an audio signal input interface (audio signal input device) provided on the input side of the personal computer 3. This circuit is constructed such that one of an audio signal input circuit for receiving multiplex audio data L/R and an input circuit for receiving analog audio signals SL, SR may be selected. The states of switches 31, 32 can be set by a CPU (not shown) in initializing mode or the like or by manual operation to select one of the above input circuits, and the selected input circuit is adapted to receive the multiplex audio data L/R or the audio signals. That is, both the multiplex audio data L/R and the analog audio signals SL, SR are input to the audio signal input interface of the personal computer 3 through analog audio signal input lines pre-installed in the computer 3.

Where the switches 31, 32 are placed in the states as shown in FIG. 9, to select the input circuit for the multiplex audio data L/R, the multiplex audio data L/R is received via a terminal 34 of one of channels of an input terminal 33 on the analog audio signal input lines which also receive analog audio signals SL, SR, and the clock signal $\phi$ produced within the personal computer 3 is generated to the outside of the interface via a terminal 35 of the other channel of the input terminal 33.

The received multiplex audio data L/R passes through the switch 31, and is supplied to decimation filters 36, 37. Each of the decimation filters 36, 37 is comprised of a digital low-pass filter (DLPF) 38, 39 for removing aliasing distortion from the audio data and producing multiple-bit data stream, and a decimation processor 40, 41 for thinning data so as to decrease the sampling frequency of the output from the low-pass filter to the sampling frequency for PCM data. To slightly shift the sampling timing with respect to switching of the left and right channels, a clock signal $\phi'$ that is delayed relative to the clock signal $\phi$ about 20 ns by a delay circuit 42 is supplied to the digital low-pass filter (DLPF) 39, and a clock signal $-\phi$ into which the clock signal $\phi'$ is inverted by an inverter 43 is supplied to the digital low-pass filter (DLPF) 38. The frequency of the clock signal $\phi$ is divided by a counter 44, and the divided frequency clock signal $\phi''$ having the sampling frequency of PCM is supplied to the decimation processors 40, 41. In this manner, n-bit PCM data DL, DR are generated from the decimation filters 36, 37, and entered into the inside of the personal computer 3.

Where the analog audio signals SL, SR are received, the switches 31, 32 are switched so that the analog audio signals SL, SR are respectively directed to the A/D converters 45, 46, and subjected to ordinary multiple-bit A/D conversion, based on the divided frequency clock signal $\phi''$, to produce PCM data DL, DR.

In the present embodiment, as described above, the construction of the interface is simplified since special processes such as synchronizing, packeting and decoding, are not required to be performed, and the transmitted audio signal, which is comprised of digital data, is less likely to be affected by noise. Further, the clock signal and multiplex audio data can be transmitted though analog audio signal input lines capable of transmitting one-bit data, thus permitting the use of analog audio input lines or the like pre-installed on the computer, with no need to provide special input terminals. Moreover, the analog input lines and circuits used after conversion into PCM data may also be commonly used.

A method of transmitting an audio signal according to one embodiment of the present invention will be now described.

Figure 10:
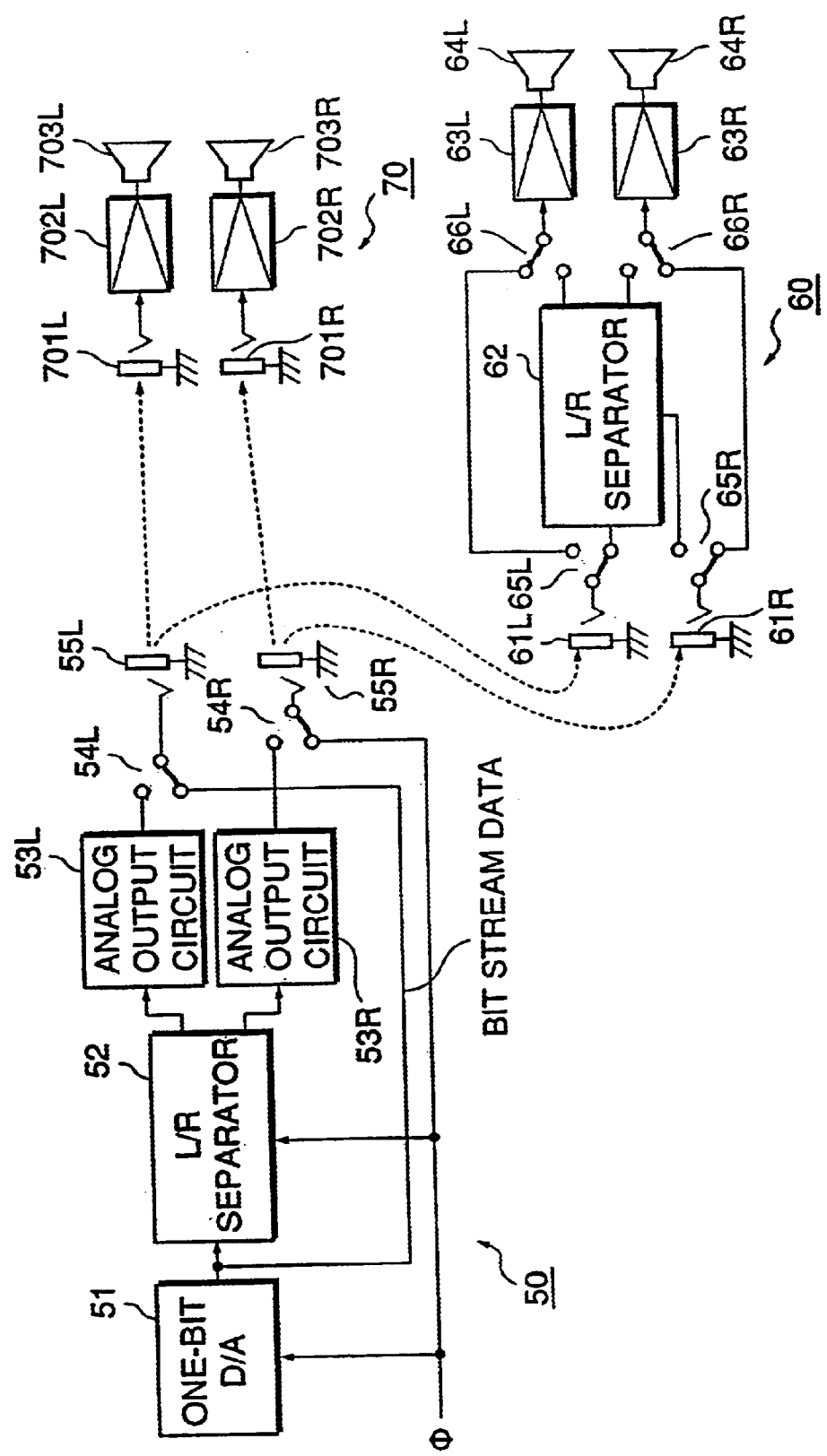
FIG. 10 is a block diagram showing the construction of a system to which an audio signal transmitting method according to one embodiment of the present invention is applied.

FIG. 10 shows the construction of a system to which the audio signal transmitting method of the present embodiment is applied. In FIG. 10, the present system is mainly comprised of an audio signal transmitting apparatus 50 and an audio signal receiving and reproducing apparatus 60, which also constitute embodiments of the present invention. Reference numeral 70 denotes a known loudspeaker system equipped with amplifiers.

The audio signal transmitting apparatus 50 is provided in an output unit of a tone generator board of a personal computer, for example, for transmitting an audio signal. As shown in FIG. 10, the audio signal transmitting apparatus 50 of the present embodiment includes a one-bit D/A converter 51, an L/R separator 52, analog output circuits 53L, 53R, switches 54L, 54R, and signal output terminals 55L, 55R.

The one-bit D/A converter 51 performs oversampling and delta-sigma ($\Delta\Sigma$) modulation on a digital audio signal reproduced by a reproducing system (not shown), and generates one-bit pulse density-modulated bit stream data. This type of one-bit D/A converter is often employed in analog output units of recent audio equipment.

Figure 11:
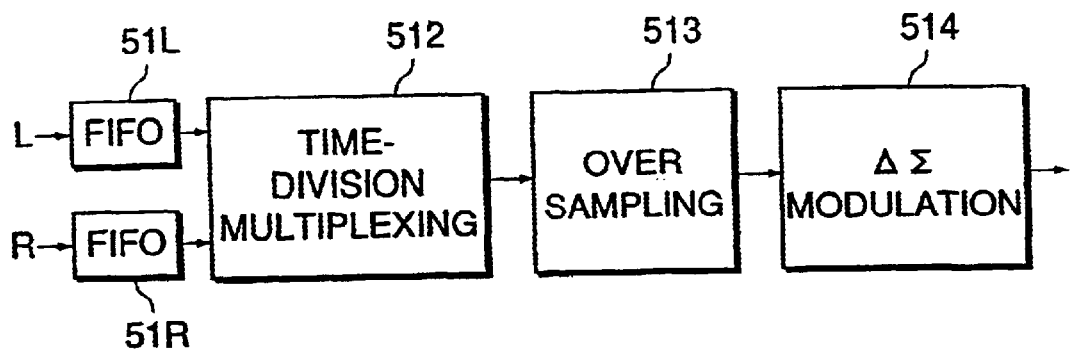
FIG. 11 is a view showing the construction of a single-bit D/A converter in the system of FIG. 10.

FIG. 11 shows the construction of an example of the one-bit D/A converter 51. In FIG. 11, FIFO (First-In First-Out) 511L and FIFO 511R occasionally take in 16-bit digital audio signals of L channel and R channel from the reproducing system, respectively, to hold them, and generate the digital audio signals in the order from the oldest to the latest, at a given sampling rate (48 kHz, for example). The D/A converter 51 also has a time-division multiplexer 512, which performs time-division multiplexing on the digital audio signals generated from the FIFOs 511L, 511R, and alternately outputs the digital audio signal of the two channels at a fixed rate, such that the signal of the left channel is followed by that of the right channel, which is then followed by that of the left channel and so on.

An oversampling unit 513 performs oversampling processing (including an interpolation process) on the thus generated digital audio signal for each of L, R channels, so as to convert the signal into a digital audio signal generated at a sampling rate that is 128 times that of the original signal. A delta-sigma ($\Delta\Sigma$) modulator 514 performs delta-sigma modulation for each channel, on the digital audio signal generated from the oversampling unit 513. Then, signals resulting from the delta-sigma modulation for each channel are subjected to time division multiplexing, to produce bit stream data, which is generated at a sampling rate (of 12.288 MHz, for example) which is far higher than that of the original digital audio signals. The bit stream data are generated in synchronization with the clock signal $\phi$ of a fixed frequency such that each bit data of the bit stream data which correspond to the L channel is generated upon a rise of the clock signal $\phi$, and each stream data corresponding to the R channel is generated upon a fall of the clock signal.

The L/R separator 52 shown in FIG. 10 serves to separate the bit stream data supplied from the delta-sigma modulator 514 in the above manner, into data to be present in the L channel and data to be present in the R channel.

Figure 12:
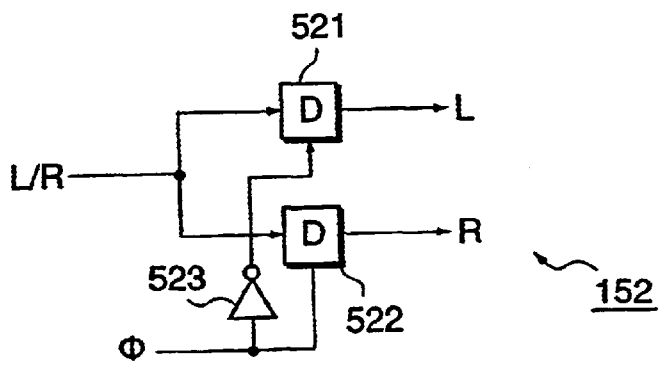
FIG. 12 is a view showing the construction of a L/R separator used in the system of FIG. 10.

FIG. 12 shows the construction of an example of the L/R separator 52. This L/R separator 52 is comprised of two flip flops 521, 522, and an inverter 523 for inverting the clock signal $\phi$. In this L/R separator 52, when the clock signal $\phi$ falls, bit data of the L channel generated from the delta-sigma modulator 514 upon an immediately preceding rise of the clock pulse signal $\phi$ is written into the flip flop 521. When the clock signal $\phi$ rises, bit data of the R channel generated from the modulator 514 upon an immediately preceding fall of the clock pulse signal is written into the flip flop 522. In this manner, each bit data of the bit stream data for each channel is written into a corresponding one of the flip flops 521, 522, and the bit stream data of the respective L, R channels are separately generated from the corresponding flip flops 521, 522.

Figure 13:
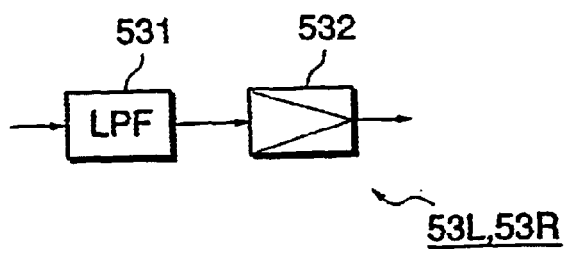
FIG. 13 is a view showing the construction of an analog output circuit in the system of FIG. 10.

The analog output circuits 53L, 53R of FIG. 10 provide analog signal reproducing means for converting the bit stream data of respective channels obtained from the L/R separator 52 into corresponding analog audio signals. As shown in FIG. 13, each of the analog output circuits 53L, 53R is comprised of a low-pass filter 531 and an amplifier 532.

The low-pass filter 531 receives the bit stream data from the L/R separator 52. The received bit stream data contains shaping noise caused by the delta-sigma modulation, as well as the spectrum of the original audio signal. The low-pass filter 531, which is provided for removing the shaping noise from the bit stream data to produce analog audio signals, is a first-order low-pass filter using one resistance and one capacitor. The spectrum of the shaping noise is concentrated at a frequency band around the sampling rate of the bit stream data, which is far away from the cut-off frequency (48 kHz, for example) of the original audio signals (refer to FIG. 8). Accordingly, even the above first-order low-pass filter may be able to attenuate the shaping noise with a sufficient attenuation factor of about 48 dB, so that audio signals corresponding to the original audio signals can be obtained from the bit stream data.

The switches 54L and 54R shown in FIG. 10 are used for selecting signals to be generated from the signal output terminals 55L, 55R, depending upon instructions of the user. More specifically, the audio signal transmitting apparatus 50 has an analog output mode and a digital output mode, one of which can be selected by the user. When the analog output mode is selected by the user, the switches 54L, 54R are placed in the positions for selecting the analog output circuits 53L and 53R, respectively, and the analog audio signals of the L, R channels generated from these circuits 53L, 53R are supplied to the signal output terminals 55L, 55R. Where the digital output mode is selected by the user, on the other hand, the switches 54L, 54R are placed in the positions for selecting the bit stream data and clock signal $\phi$, respectively, and these bit stream data and clock signal are supplied to the signal output terminals 55L and 55R.

The audio signal receiving and reproducing apparatus 60 according to the present embodiment will be now explained. This apparatus 60 includes signal input terminals 61L, 61R for receiving signals supplied from the audio signal transmitting apparatus 50 of the present embodiment, or from other audio signal transmitting apparatus that are generally used.

The audio signal receiving and reproducing apparatus 60 includes an L/R separator 62 as means for separating the time division multiplexed bit stream data into those corresponding to respective channels. This L/R separator 62 is constructed similarly to the above-described L/R separator 52.

Amplifiers 63L, 63R and loudspeakers 64L, 64R constitute analog signal reproducing means for generating the analog audio signals of the respective L-channel and R-channel as sounds. Although these amplifiers 63L, 63R and loudspeakers 64L, 64R are constructed similarly to an ordinary loudspeaker system with amplifiers, the amplifiers 63L and 63R of the present embodiment receive bit stream data when the digital output mode is selected, and therefore a first-order low-pass filter (not shown) for removing shaping noise is provided in an input port of each amplifier.

Switches 65L and 65R are inserted between the signal input terminals 61L and 61R and the L/R separator 62, and switches 66L and 66R are inserted between the L/R separator 62 and the amplifiers 63L and 63R. These switches are switched depending upon the mode selected by the user.

More specifically, the audio signal receiving and reproducing apparatus has an analog input mode and a digital input mode, one of which can be selected by the user. When the analog input mode is selected by the user, the switches 65L, 65R, 66L and 66R are placed in the positions for connecting the signal input terminals 61L and 61R to respective inputs of the amplifiers 63L and 63R. When the digital input mode is selected by the user, on the other hand, the switches 65L, 65R are placed in the positions for connecting the signal input terminals 61L, 61R to an input of the L/R separator 62 for receiving the bit stream data, and an input of the separator 62 for receiving the clock signal, respectively, and the switches 66L and 66R are placed in the positions for connecting outputs of the L/R separator 62 for generating the bit stream data of the respective channels, to corresponding inputs of the amplifiers 63L and 63R.

The loudspeaker system 70 equipped with amplifiers is comprised of signal input terminals 71L and 71R, amplifiers 72L and 72R, and loudspeakers 73L and 73R, which correspond to the L, R channels, respectively.

The operation of the present embodiment will be now explained. First, the operation in the case where a combination of the audio signal transmitting apparatus 50 and audio signal receiving and reproducing apparatus 60 of the present embodiment is used will be explained. In this case, the user connects the signal output terminal 55L to the signal input terminal 61L with a cable, and connects the signal output terminal 55R to the signal input terminal 61R with another cable. Then, the audio signal transmitting apparatus 50 is set in the digital output mode, and the audio signal receiving and reproducing apparatus 60 is set in the digital input mode.

As a result, bit stream data generated from the one-bit D/A converter 51 of the audio signal transmitting apparatus 50 and the clock signal φ that is in synchronization with the bit stream data are transmitted over respective cables, and received by the L/R separator 62 of the audio signal receiving and reproducing apparatus 60.

The bit stream data are divided or separated by the L/R separator 62 into respective blocks of bit stream data corresponding to the L, R channels, based on the clock signal φ and the respective blocks of the bit stream data are fed to the amplifiers 63L and 63R. The low-pass filter provided at the input of each amplifier 63L and 63R removes shaping noise from a corresponding block of the bit stream data. The resultant analog audio signals are then amplified by the amplifiers 63L, 63R, and generated from the loudspeakers 64L and 64R.

In this manner, the audio signal is transmitted as a digital signal from the audio signal transmitting apparatus 50 to the audio signal reproducing apparatus 60, assuring high resistance to noise. Further, since the conversion of the bit stream data into analog signals can be accomplished merely by directly passing the transmitted bit stream data through the analog low-pass filter, any bit synchronization or special modulation need not be performed on the side of the audio signal receiving and reproducing apparatus 60.

While the most typical operation of the present embodiment has been described above, each apparatus according to the present embodiment may be used in combination with other known apparatus that have been generally used in the art.

Where the audio signal transmitting apparatus 50 of the present embodiment is used in combination with the known loudspeaker system 70 with amplifiers, the signal output terminal 55L and signal input terminal 71L, and the signal output terminal 55R and signal input terminal 71R of these apparatus are connected to each other with respective cables. By setting the audio signal transmitting apparatus 50 in the analog output mode, the switches 54L, 54R of the audio signal transmitting apparatus 50 are placed in the positions for selecting analog audio signals of L, R channels transmitted from the analog output circuits 53L and 53R, and the selected audio signals are transmitted to the loudspeaker system7 with amplifiers over the respective cables.

In the case where the audio signal receiving and reproducing apparatus 60 of the present embodiment is used in combination with a general audio signal transmitting apparatus capable of generating only analog audio signals, signal output terminals of L, R channels of the transmitting apparatus are connected to the signal input terminals 61L and 61R of the audio signal receiving and reproducing apparatus 60, and the apparatus 60 is set in the analog input mode.

What is claimed is:

1. A method of entering an audio signal into a data processing apparatus, wherein analog audio signals of two channels as said audio signal are digitized by and transmitted from an audio signal output device on a side of an audio source to an audio signal input device on a side of the data processing apparatus, comprising the steps of:

a) supplying a clock signal from said audio signal input device to said audio signal output device via a first signal line;

b) performing delta-sigma (ΔΣ) modulation on the analog audio signals of two channels in said audio signal output device so as to convert each of said analog audio signals of two channels into one-bit digital audio data for each of said two channels, based on said clock signal supplied to the audio signal output device and an inverted clock signal produced from said clock signal;

c) alternatively selecting said one-bit digital audio data converted based on said clock signal, according to said inverted clock signal, and said one-bit digital audio data converted based on said inverted clock signal, according to said clock signal, in said audio signal output device, to perform time-division multiplexing on the two one-bit digital audio data for said two channels, to thereby produce one-bit multiplex audio data; and d) supplying said one-bit multiplex audio data from said audio signal output device to said audio signal input device via a second signal line.

2. The method of entering an audio signal according to claim 1, wherein said multiplex audio data and said clock signal are respectively transmitted to said audio signal input device and said audio signal output device, through respective input lines provided in said data processing apparatus for receiving analog audio stereo signals.

3. The method of entering an audio signal according to claim 1, further comprising the step of separating said one-bit multiplex audio data into at least two streams of data corresponding to respective ones of said two channels and converting each of said at least two streams of data into multiple-bit PCM data for said each channel in said audio signal input device.

4. A method of transmitting an audio signal from an audio signal transmitting apparatus to an audio signal receiving apparatus, comprising the steps of:

a) performing delta-sigma (ΔΣ) modulating and time-division multiplexing on audio signals of left channel and right channel as said audio signal based on a clock signal and an inverted clock signal produced therefrom in said audio signal transmitting apparatus, to produce bit stream data as a result of the time-division multiplexing of said audio signals, the time-division multiplexing of said audio signals be carried out by alternatively selecting an audio signal on which the delta-sigma (ΔΣ) modulation is performed based on said clock signal, according to said inverted clock signal, and an audio signal on which the delta-sigma (ΔΣ) modulation is performed based on said inverted clock signal, according to said clock signal;

b) transmitting said bit stream data and said clock signal that is in synchronization with the bit stream data via two signal lines respectively, from said audio signal transmitting apparatus to said audio signal receiving apparatus; and c) separating said bit stream data into two streams of data corresponding to respective ones of said left channel and right channel, based on said clock signal and an inverted clock signal produced therefrom, in said audio signal receiving apparatus.

* * * * *